(12) United States Patent
Doi et al.

(10) Patent No.: US 9,019,055 B2
(45) Date of Patent: Apr. 28, 2015

(54) CYLINDRICAL MAGNETIC CIRCUIT AND PRODUCING METHOD THEREOF

(71) Applicant: Shin-Etsu Chemical Co., Ltd., Tokyo (JP)

(72) Inventors: Yuhito Doi, Echizen (JP); Dai Higuchi, Echizen (JP); Shingo Hashimoto, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/919,357

(22) Filed: Jun. 17, 2013

(65) Prior Publication Data

US 2013/0342299 A1    Dec. 26, 2013

(30) Foreign Application Priority Data

Jun. 20, 2012   (JP) .................................. 2012-138590

(51) Int. Cl.
*H01F 7/02* (2006.01)
*H02K 1/27* (2006.01)
*H01F 41/02* (2006.01)

(52) U.S. Cl.
CPC ............ *H01F 7/0273* (2013.01); *H02K 1/2786* (2013.01); *H01F 41/0253* (2013.01)

(58) Field of Classification Search
USPC .......................................................... 335/306
See application file for complete search history.

(56) References Cited

U.S. PATENT DOCUMENTS

| | | | | |
|---|---|---|---|---|
| 3,775,717 A * | 11/1973 | Braillon | .......................... | 335/295 |
| 4,748,359 A * | 5/1988 | Yahara et al. | ............ | 310/156.13 |
| 4,999,600 A * | 3/1991 | Aubert | ........................... | 335/306 |
| 5,236,091 A * | 8/1993 | Kauppila et al. | .............. | 209/212 |
| 7,167,067 B2 * | 1/2007 | Higuchi | ........................ | 335/301 |
| 2005/0030138 A1* | 2/2005 | Higuchi | ........................ | 335/306 |

* cited by examiner

*Primary Examiner* — Shawki S Ismail
*Assistant Examiner* — Lisa Homza
(74) *Attorney, Agent, or Firm* — Roberts Mlotkowski Safran & Cole, P.C.; David S. Safran

(57) ABSTRACT

A cylindrical magnetic circuit which is able to prevent deformation of a cylindrical yoke for holding two or more magnets without increasing the thickness of the yoke more than required, and a method of producing such a circuit. A cylindrical magnetic circuit (1) for generating a magnetic field in a space inside of plural annularly placed magnets (2), including: a cylindrical yoke (3) which is placed radially outside the magnets (2) and is fixed to the magnets directly or via an intermediate member or substance; and at least one nonmagnetic member 4 existing between pairs of circumferentially adjacent magnets, and a method for producing the cylindrical magnetic circuit (1).

6 Claims, 3 Drawing Sheets

CYLINDRICAL MAGNETIC CIRCUIT AND PRODUCING METHOD THEREOF

BACKGROUND OF THE INVENTION

1. Field of the Invention

The present invention relates to a cylindrical magnetic circuit comprising two or more permanent magnets placed annularly and generating a magnetic field inside, and a method of producing such a cylindrical magnetic circuit.

2. Description of the Related Art

In an embodiment for producing a magnetic field, a circuit is known in which two or more permanent magnets are combined to form a cylindrical shape and a magnetic field formed inside is used. The circuit in which two or more permanent magnets are combined is called a magnetic circuit, and examples of using a magnetic field inside a cylindrical magnetic circuit include a dipole-ring magnetic circuit, a six-pole magnetic circuit, and the like.

It is generally preferable for these magnetic circuits to have a smaller external dimension provided so that a desired magnetic field is generated inside. In view of this, columnar magnets having a section in a trapezoid shape are combined annularly, so that a density of the magnets in a space is increased. Further, in order to maintain the annular state, the magnets are fixed to a cylindrical yoke, and it is desirable that the yoke be thin so as to reduce the external dimension.

Conceivable methods for producing a cylindrical magnetic circuit include: a method in which two or more magnets are inserted from the cylindrical end along a direction of a central axis of a round section of the cylindrical yoke (hereinafter referred to as "an axial direction"), and the magnets are annularly placed along the inside of the cylindrical yoke; and a method in which two or more magnets are inserted radially from a side of the cylinder along a cylindrical magnetic circuit to be formed and the magnets are placed annularly. In the method in which the magnets are inserted from the cylindrical end along the axial direction, a member serving as a guide is preferably attached to the yoke, so that the magnets are inserted into the yoke along the guide and then the magnets are fixed to the yoke. On the other hand, in the method in which the magnets are inserted radially from a side of the cylinder, a pair of round or annular members for annularly placing the magnets therebetween is preferably provided first. The magnets are inserted into a space between the round or annular members from a radial outside thereof so as to be placed annularly, and the magnets are temporarily held by the round or annular members in the annular state. A yoke is placed so as to cover the magnets placed annularly, the magnets are fixed to the yoke, and then the round or annular members are removed.

In either of the producing methods, the magnets, in a magnetized state, are inserted. Accordingly, during assembling of the cylindrical magnetic circuit, an attractive or repulsive force works between a magnet to be incorporated and a magnet which has been already incorporated. This force continues working between magnets adjacent to each other after the assembling, and the force also continues working on the yoke holding the magnets. If the strength of the yoke decreases as a result of making the yoke thin, the force may deform the yoke and further change the positional relationship between the magnets depending on a relation between the strength of the yoke and the force working between the magnets, which may make it difficult to obtain a desired magnetic field distribution.

SUMMARY OF THE INVENTION

The present invention is accomplished in view of the above circumstances, and an object of the present invention is to provide a cylindrical magnetic circuit which is able to prevent deformation of a yoke due to an attractive or repulsive force between magnets without thickening the cylindrical yoke more than required, and a method for producing thereof.

As a result of hard study, the present inventors have found that when nonmagnetic members are provided between the magnets placed annularly, a force working between the magnets mainly becomes a compressive stress without becoming a bending stress on a yoke, thereby making it possible to prevent a deformation of the yoke. The present invention has been accomplished from the above viewpoint.

That is, the present invention provides a cylindrical magnetic circuit for generating a magnetic field in a space inside two or more magnets placed annularly, the circuit comprising: the two or more magnets placed annularly; a cylindrical yoke, being placed radially outside the magnets and allowing the magnets to be fixed to the yoke directly or via an intermediate; and at least one nonmagnetic member existing between two of the magnets circumferentially adjacent to each other.

Further, the present invention provides a method for producing a cylindrical magnetic circuit for generating a magnetic field in a space inside two or more magnets placed annularly, the method comprising the steps of: placing the two or more magnets annularly along an inside of a cylindrical yoke; and inserting at least one nonmagnetic member between two of the magnets circumferentially adjacent to each other. Further, the present invention provides a method for producing a cylindrical magnetic circuit for generating a magnetic field in a space inside two or more magnets placed annularly, the method comprising the steps of: placing the two or more magnets annularly; inserting at least one nonmagnetic member between two of the magnets circumferentially adjacent to each other; and placing a cylindrical yoke so as to cover a radial outside of the two or more magnets placed annularly.

According to the present invention, it is possible to prevent deformation of a cylindrical yoke for holding magnets in a cylindrical magnetic circuit, and it is also possible to minimize the thickness of the yoke, thereby making it possible to reduce the external dimension of the magnetic circuit.

The present invention will be described below in further detail in conjunction with the accompanying drawings.

DETAILED DESCRIPTION OF THE INVENTION

A cylindrical magnetic circuit according to the present invention is configured such that two or more columnar magnets are placed annularly so that sections thereof form a ring, and the cylindrical magnetic circuit generates a magnetic field therein. A section of each of the magnets perpendicular to an axial direction of the circuit has, for example, a trapezoid (when two parallel sides are designated as a short side and a long side, the short side is placed at an axial side), a sector (including not only a circular sector constituted by a circular arc and two radial lines but also a figure constituted by two concentric arcs and two radial lines opposed to each other. The same shall apply hereinafter), or a rectangular. It is preferable for the two or more magnets to have the same shape. Further, the magnets can be of any given number usable as a magnetic circuit and are preferably at least 8 but at most 48 magnets having the same shape. The reason is as follows: if the number of magnets is less than 8, a magnetic field distribution may not be in a desired state; and if the number of magnets is more than 48, each magnet becomes elongated in a radial direction and has a reduced contact face at a yoke side, which may make it difficult to support a bending moment which is caused by an attractive or repulsive force between the magnets and which works on interfaces between the magnets and the yoke.

The cylindrical magnetic circuit comprises at least two or more magnets placed annularly, and a cylindrical yoke placed radially outside the magnets. Each of the magnets is fixed to the yoke directly or via an intermediate. As a method for the fixation, any method can be adopted. For example, the magnets and the yoke may be bonded together, or in a case where they are fixed via an intermediate member, the magnets may be bonded to the intermediate member, and the intermediate member may be fixed to the yoke by use of a bolt or the like.

Figure 1:
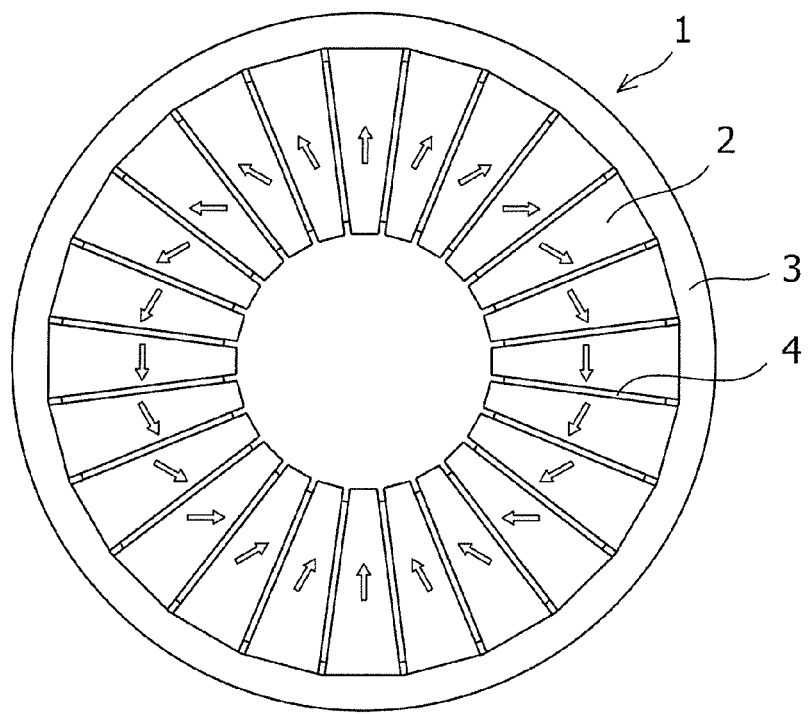
FIG. 1 is a view illustrating a dipole-ring magnetic circuit according to one embodiment of the present invention.
Figure 2:
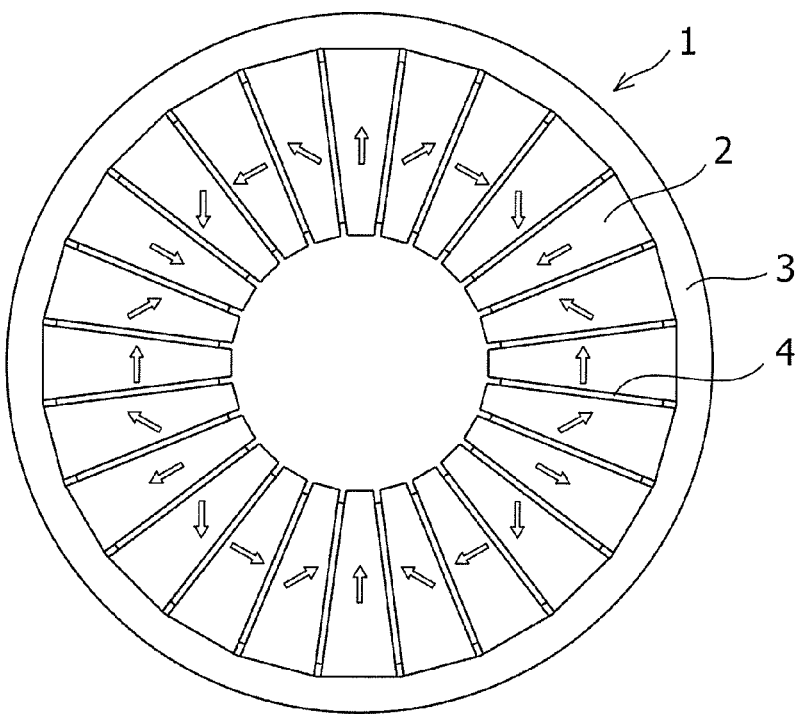
FIG. 2 is a view illustrating a six-pole magnetic circuit according to another embodiment of the present invention.
Figure 3:
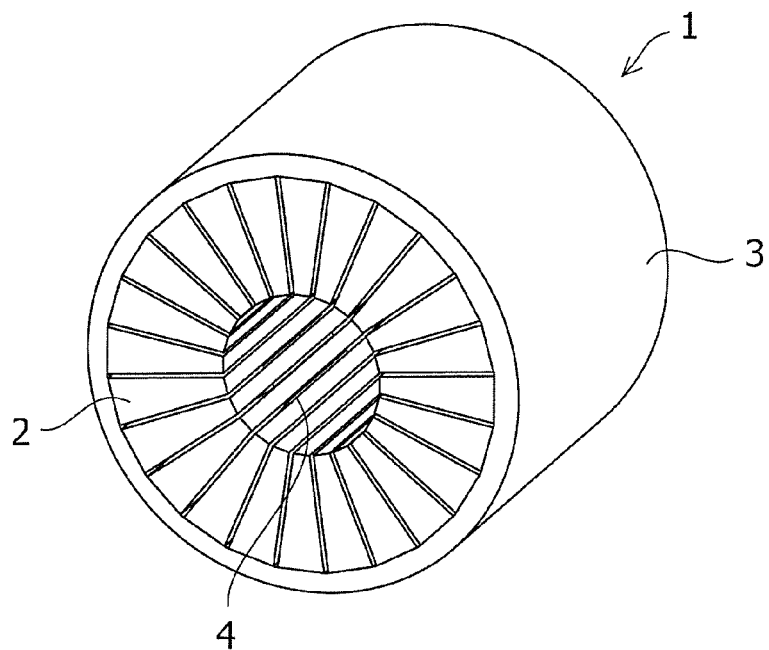
FIG. 3 is a perspective view illustrating a cylindrical magnetic circuit according to one embodiment of the present invention.

FIG. 1 illustrates a configuration diagram of a dipole-ring magnetic circuit 1 according to one embodiment of the present invention. In the example of FIG. 1, the cylindrical magnetic circuit 1 comprises at least 8 magnets 2 placed annularly, and a cylindrical yoke 3 placed outside the magnets 2 and allowing the magnets 2 to be fixed thereto. An arrow in FIG. 1 indicates a magnetization direction of each of the magnets 2. The cylindrical magnetic circuit of the present invention is not limited to a dipole-ring magnetic circuit, and may be a six-pole magnetic circuit as illustrated in FIG. 2, for example. The magnetic circuit 1 of the present invention is configured in a cylindrical shape as illustrated in the perspective view of FIG. 3, for example. It is noted that the same reference sign is assigned to elements having a similar function in the respective drawings.

In the present invention, permanent magnets, such as a ferrite magnet and a rare-earth sintered magnet of SmCo and NdFeB are used as the magnets, for example. These magnets are formed by a powder metallurgy method in which powder of a magnet component is put in a die and molded, and sintered for solidification. Such a ferrite magnet and a rare-earth sintered magnet are brittle materials, and a high tensile strength cannot be expected. In view of this, it is desirable to constitute the cylindrical magnetic circuit in such a manner that a force exerted on a magnet works as a compressive stress rather than a tensile stress.

Figure 4:
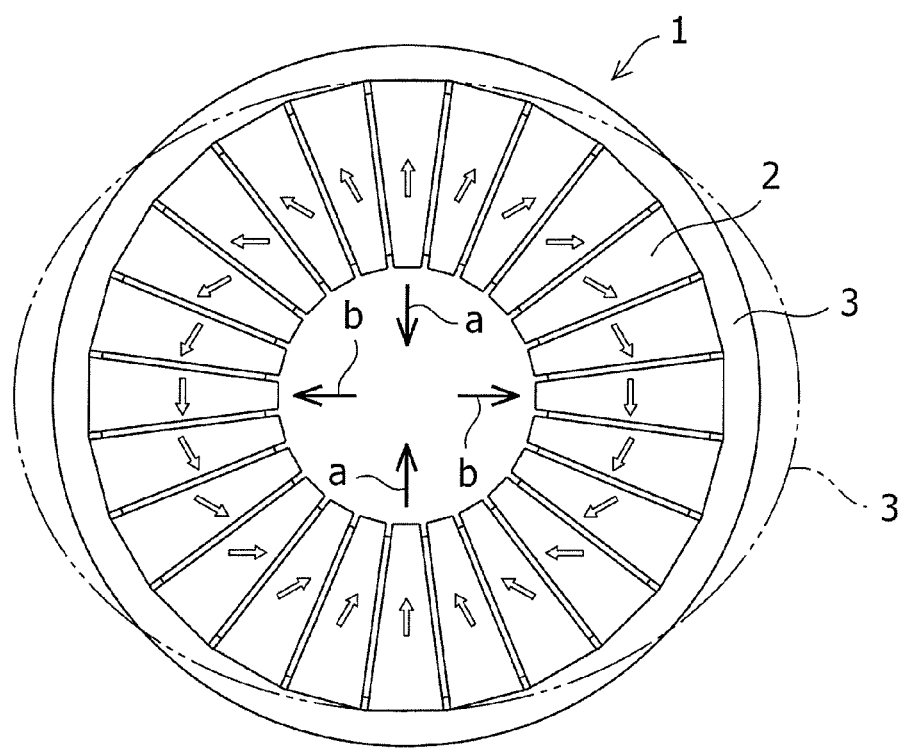
FIG. 4 is a view illustrating how a dipole-ring magnetic circuit is deformed.

In order to generate a magnetic field of a dipole, a quadrupole, or a hexapole, for example, inside the cylindrical magnetic circuit, the cylindrical magnetic circuit is constituted by two or more magnets having different magnetization directions in combination. Accordingly, forces working between magnets adjacent to each other are complicated. Further, in order to increase the strength of the magnetic field produced, it is necessary to lengthen the radial dimension of the magnets placed annularly. However, a force eventually exerted on the magnets works as a bending moment applied to interfaces where the magnets are fixed to the yoke, thereby causing the yoke to be easily deformed. This deformation of the yoke is described below with reference to an example of the dipole-ring magnetic circuit 1 in FIG. 4. The magnets 2 placed annularly causes an attractive force in the directions of the arrows "a" and a repulsive force in directions of arrows "b", so that a crushing force in an up-to-down direction in the figure works on the yoke 3, thereby easily causing a deformation as indicated by dot-dash line 3'.

On the other hand, if there are fillings provided between the magnets, it is possible to maintain a state in which the magnets are placed annularly owing to an effect similar to a keystone in a stone bridge. According to the present invention, the cylindrical magnetic circuit comprises at least one nonmagnetic member (a nonmagnetic member 4 in the examples of FIGS. 1 & 2) between pairs of the magnets that are circumferentially adjacent to each other. This allows a force working between the magnets to mainly become a compressive stress on the magnets so as to reduce the force exerted on the yoke, thereby making it possible to prevent deformation of the yoke. It is preferable that the nonmagnetic member be inserted into one or more, and preferably, all of the spaces between the magnets. Further, the nonmagnetic member is applicable to a magnetic circuit of any dimension which is usable as a cylindrical magnetic circuit.

The reason for using the nonmagnetic member is as follows: when a magnetic material is provided between magnets, a magnetic flux from the magnets goes through the magnetic material, so that a desired magnetic field cannot be generated in a space inside the magnetic circuit. It is necessary for the nonmagnetic member to be a solid which can endure an attractive force working between the magnets. This is because, if the nonmagnetic member is not a solid at the time of assembly, it is difficult to obtain the effect of restraining deformation due to the attractive force between the magnets. Accordingly, the deformation may not be restrained by pouring a melted resin and then curing the resin in some cases. Any solid nonmagnetic member, including a metal and a cured resin, can be adopted provided that the solid nonmagnetic member is a material which can satisfy such a requirement. The solid nonmagnetic member is desirably a metallic material having ductility, preferably copper or a copper alloy, more preferably brass.

When the nonmagnetic member has ductility, the nonmagnetic member is deformed slightly, thereby making it possible to bring an effect of stress relief. The nonmagnetic member can be of any shape insertable into a gap between magnets. The shape of the nonmagnetic member is preferably a column having a height parallel to an axial direction of the cylinder when the nonmagnetic member is inserted into the cylindrical magnetic circuit, and having a transverse section, perpendicular to the axial direction, of a quadrangle (including a rectangle and a trapezoid), a circular arc sector (including not only a circular sector constituted and defined by two radial lines, but also a figure constituted by two concentric arcs opposed to each other and two radial lines opposed to each other. The same shall apply hereinafter), or a triangle. More preferably, the shape of the nonmagnetic member is a plate-shape which is a column having a rectangular transverse section (including a foil having short sides of the rectangle shortened more).

The nonmagnetic member is preferably configured so as to have a size which does not protrude beyond end faces in the axial direction of the magnetic circuit and toward an internal space of the magnetic circuit. The reason is as follows: if the nonmagnetic member protrudes beyond the end faces, a component corresponding to a lid cannot be attached; and if the nonmagnetic member protrudes toward the internal space, the nonmagnetic member may interfere with a component using the magnetic field produced. That is, it is preferable that the nonmagnetic member be shorter than a radial length of the magnets and be shorter than an axial length of the magnets. An axial dimension of the nonmagnetic member is preferably 30% to 95%, more preferably 50% to 80% of an axial dimension of the magnets. A radial dimension (corresponding to a radial direction of the cylindrical magnetic circuit) of the nonmagnetic member is preferably 30% to 95%, more preferably 50% to 80% of a radial dimension of the magnets. In order that a force to be exerted between the nonmagnetic member and a magnet works as a compressive stress, it is desirable that a contact face between the magnet and the nonmagnetic member have an area large enough to avoid stress concentration. In view of this, the aforementioned dimension ranges are preferable. A dimension of the nonmagnetic member in a thickness direction (corresponding to a tangential direction of the cylindrical magnetic circuit) is preferably selected to reduce an air space between the magnets as much as possible. The reduction may be also achieved by combining two or more nonmagnetic members in conformity to the required size. This makes it possible to absorb a tolerance at the time of the assembly.

The columnar nonmagnetic member is inserted between magnets adjacent to each other in the cylindrical magnetic circuit so that a height direction of its column is preferably parallel to the axial direction of the cylindrical circuit. More specifically, in a case where a transverse section of the column which is perpendicular to the height direction (the axial direction) is rectangular, for example, the nonmagnetic member is inserted so that two long sides of the transverse section are preferably parallel to a radial direction of the cylindrical circuit. In a case where the transverse section is trapezoidal, for example, when two parallel sides are designated as a short side and a long side, the nonmagnetic member is inserted so that the short side is preferably placed at an axial side. And in a case where the transverse section is a sector, the transverse section is inserted so that a central angle side of the arc preferably faces the axis of the cylindrical circuit, while an arc side (a longer arc in a case where there are two arcs) faces an inner peripheral surface of the cylindrical yoke. The nonmagnetic member can be placed at any position with respect to a radial direction and an axial direction of the magnet, more preferably at a center with respect to a radial direction and an axial direction of the magnet.

One or more nonmagnetic members may exist in the circumferential direction between respective pairs of magnets. In a case where two or more nonmagnetic members exist between the two of the magnets, the number of nonmagnetic members is adjustable according to a space between the magnets, which is preferable. Arrangement of two or more nonmagnetic members makes it possible to perform the adjustment without preparing special nonmagnetic members for respective magnetic circuits having various dimensions, and further makes it possible to perform the adjustment even if spaces between respective magnets are not uniform in a magnetic circuit due to tolerance. Further, in this case, two or more nonmagnetic members having the same shape or different shapes may be combined and two or more nonmagnetic members having the same dimension or different dimensions may be combined.

The mechanical strength of the nonmagnetic member is selected as follows: a tensile strength thereof measured according to a "metallic material tensile testing method" of JIS Z2241 is preferably 50 N/mm$^2$ (MPa) to 900 N/mm$^2$ (MPa), more preferably 200 N/mm$^2$ (MPa) to 600 N/mm$^2$ (MPa). Since a compressive strength of the rare-earth sintered magnet used for the magnetic circuit is about 900 MPa, it is not necessary that the mechanical strength be stronger than this.

Further, the magnetic circuit according to the present invention may comprise an adhesive in the following manners: in a case where only one nonmagnetic member exists between pairs of magnets, the adhesive is provided between the nonmagnetic member and the magnets; and in a case where two or more nonmagnetic members exist between two of the magnets, the adhesive is provided between the nonmagnetic members and the two magnets, and between the two or more nonmagnetic members adjacent to each other. It is preferable that the adhesive be a resin obtained by curing a room-temperature curable resin. This room-temperature curable resin can reduce frictional force between a nonmagnetic member and a magnet at the time of insertion of the nonmagnetic member for fixation. The room-temperature curable resin may be applied to the nonmagnetic member, or the room-temperature curable resin may be injected to a gap between the magnets where the nonmagnetic member is expected to be inserted.

Before the room-temperature curable resin is applied to the nonmagnetic member, a viscosity of the room-temperature curable resin measured according to JIS K6833 is preferably 1 Pa·s to 40 Pa·s, particularly preferably 5 Pa·s to 20 Pa·s. Further, before the room-temperature curable resin is injected in advance between the magnets, the viscosity of the room-temperature curable resin is preferably 1 Pa·s to 40 Pa·s, and more preferably 20 Pa·s to 40 Pa·s. A shearing adhesive strength of the room-temperature curable resin which is measured according to JIS K6850 is preferably 5 MPa to 40 MPa, and more preferably 20 MPa to 40 MPa.

As the room-temperature curable resin, any room-temperature curable resin which satisfies the aforementioned physical properties may be used, but an epoxy resin is more preferable.

According to the present invention, a method for producing a cylindrical magnetic circuit for generating a magnetic field in a space inside two or more magnets placed annularly comprises the steps of: placing the two or more magnets annularly along the inside of a cylindrical yoke, and inserting at least one nonmagnetic member between two of the magnets circumferentially adjacent to each other.

The step of placing is performed preferably in such a manner that a guide is fixed to an axial end of the yoke, each of the magnets is inserted from the cylindrical end along the guide, and subsequently, the guide is removed. It is possible to perform the fixation and removal of the guide in any manner, but preferably in such a manner that the guide is fixed before one magnet is inserted, and then removed after the one magnet is inserted. The guide is preferably formed into any shape and from any material which allow a magnet to be inserted into a predetermined position. More preferably, the guide has a channel shape which is able to house therein a width of the magnet (a width of a vertical surface to an insertion direction), and is formed from a nonmagnetic and lightweight material such as aluminum alloy. The guide is preferably fixed to the yoke by a bolt that fits into a threaded hole provided in the yoke. Further, the step of placing may comprise fixing each of the magnets to the yoke directly or via an intermediate. Any method of the fixation can be adopted as described above. For example, the magnets and the yoke may be bonded together, or in a case where they are fixed via an intermediate, the magnets may be bonded to the intermediate, and the intermediate may be fixed to the yoke by use of a bolt or the like. It is preferable for a magnet to be fixed to the yoke every time the magnet is inserted.

Figure 5:
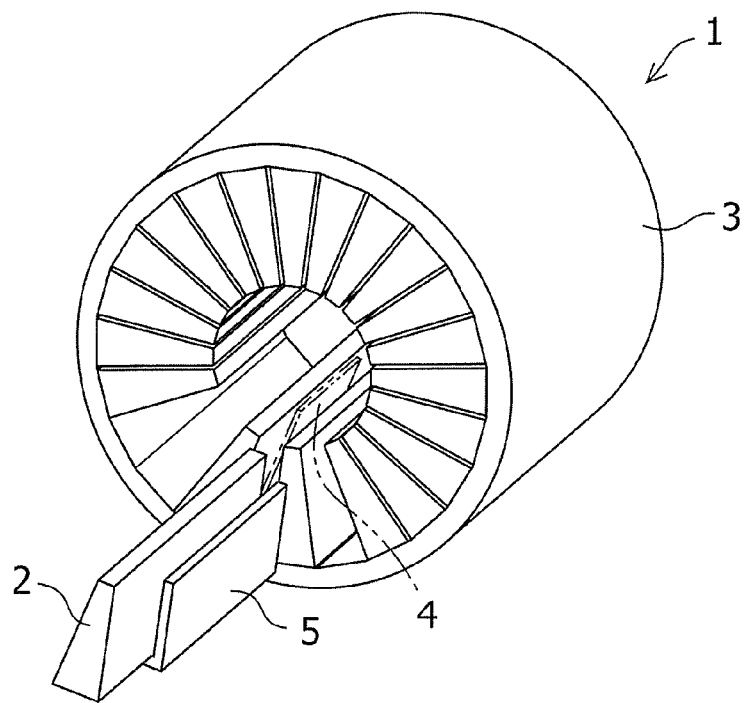
FIG. 5 is a perspective view illustrating a method for producing a cylindrical magnetic circuit, according to the present invention, in which magnets are inserted from a cylindrical end along an axial direction.

An example is illustrated in FIG. 5 for the step of placing the two or more magnets 2 annularly along the inside of the cylindrical yoke 3 in the cylindrical magnetic circuit 1. A guide 5 is fixed to an axial edge of the yoke 3 by a bolt (not illustrated), and along this guide 5, a magnet is inserted in an axial direction of the cylindrical magnetic circuit to be formed. Note that a preferred position of a nonmagnetic member 4 to be inserted later is exemplified in a hypothetical line in the example in FIG. 5.

Alternatively, according to the present invention, a method for producing a cylindrical magnetic circuit for generating a magnetic field in a space inside two or more magnets placed annularly comprises the steps of: placing the two or more magnets annularly; inserting at least one nonmagnetic member between two of the magnets circumferentially adjacent to each other; and placing a cylindrical yoke so as to cover a radial outside of the two or more magnets placed annularly.

The step of placing the two or more magnets may comprise a stage of inserting each of the two or more magnets into a space between a pair of round or annular members separated each other via the space through which opposing surfaces of the members have two or more recesses or projections in a circumferential direction, the each of the two or more magnets comprising an auxiliary member having at least one projection or recess which is fittable in at least one of the recesses or the projections of the round or annular members, and a stage of removing the round or annular members and the auxiliary member.

The step of placing the two or more magnets may further comprise a stage of attaching a guide comprising at least one recess or projection to the round or annual members in such a manner that at least one of the recesses or projections of the round or annular members is extended radially outside the round or annular members before the stage of inserting. And the stage of inserting comprises inserting each of the two or more magnets in such a manner that the recesses or projections of the guide and the round or annular members are fitted into the at least one projection or recess of the auxiliary member, and the stage of removing comprises removing the guide after the insertion.

The round or annular member is preferably formed into any shape and from any material which are able to hold magnets annularly. More preferably, the round or annular member is formed into a shape which partially or entirely cover axial ends of the magnets placed annularly, and further preferably, the round or annular member is formed so as to have an external diameter having the same length as or a length shorter than an external diameter formed by the magnets. Further, the round or annular member is preferably formed from iron, stainless, copper alloy, aluminum alloy, or the like. The recesses or projections of the round or annular members are provided on the opposed surface of the members, preferably as many as the number of the magnets. The auxiliary member is formed into any given shape which is attachable to a surface of a magnet and which has at least one projection or recess slidably fittable into/onto at least one of the recesses or projections of the round or annular members. The auxiliary member is preferably formed from nonmagnetic stainless, a copper alloy, an aluminum alloy, or the like. The auxiliary member is preferably fixed by any method which allows the auxiliary member to be attached to and removed from a magnet, but more preferably attached thereto by bolt fixation.

The guide is formed preferably into a column shape having at least a surface having at least one recess or projection which can make at least one of the recesses or projections of the round or annular members extended, and a surface attachable to an end of the round or annular member. The guide is formed from nonmagnetic stainless, copper alloy, aluminum alloy, or the like. The guide is fixed to the round or annular member by any method which allows the guide to be attached thereto and removed therefrom, but more preferably attached thereto by bolt fixation. It is possible to perform the attachment and removal of the guide in any manner, but preferably in such a manner that on insertion of the magnets, the guide is fixed before one magnet is inserted, and then removed after the one magnet is inserted.

Figure 6:
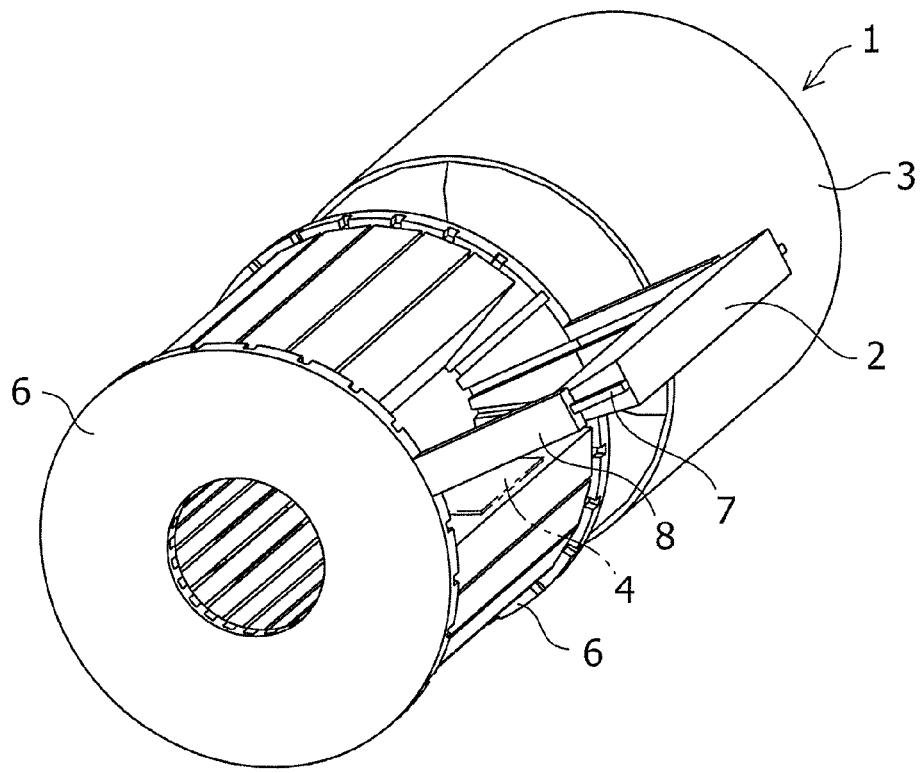
FIG. 6 is a perspective view illustrating a method for producing a cylindrical magnetic circuit, according to the present invention, in which magnets are inserted from a side of the cylinder along a radial direction.

The recesses or projections of the round or annular members and the guide may be grooves extending in a radial direction of the round or annular members, and the projection or recess of the auxiliary member may be a consecutive projection fittable in the grooves. An example is illustrated in FIG. 6 for the step of placing the two or more magnets 2 annularly in the cylindrical magnetic circuit 1. A pair of round or annular members 6 each having radially extending grooves on an opposing surface as many as the number of the two or more magnets 2 are placed so as to face each other via a space. A guide 8 having a groove for extending the groove of the round or annular member 6 radially outwardly is attached to the round or annular member 6. A magnet 2 includes an auxiliary member 7 having a consecutive projection fittable in the groove. This magnet 2 is inserted between the pair of round or annular members 6 in such a manner that the grooves of the guides 8 and the round or annular members 6 are fitted into the consecutive projection of the auxiliary member 7, and subsequently, the guide 8 is removed. Note that a preferred position of a nonmagnetic member 4 to be inserted is exemplified in a hypothetical line in the example in FIG. 6.

The step of placing a cylindrical yoke so as to cover a radial outer side of the annularly placed magnets is performed preferably after all magnets have been inserted. The step is performed in such a manner that, in a state where one of the round or annular members is removed and the magnets are held by the other of the round or annular members, a yoke is put over an outside of the magnets placed annularly from a side where the one of the round or annular members is removed, the magnets and the yoke are fixed, and the other of the round or annular members is removed. The auxiliary member is removed preferably after that. Any method can be adopted in order for the round or annular members to hold the magnets. As a method of fixing the magnets and the yoke, any method can be adopted as described above. For example, the magnets and the yoke may be bonded together, or in a case where they are fixed via an intermediate, the magnets may be bonded to the intermediate, and the intermediate may be fixed to the yoke by a bolt or the like.

According to this method for producing a cylindrical magnetic circuit, the magnets are temporarily held by the round or annular members and placed annularly, and subsequently, the yoke is placed outside the magnets. Accordingly, it is possible to reduce a thickness of the yoke which is otherwise restricted by a strength requirement of the yoke. Thus, this producing method is effective for a case where there is a restriction in keeping a radial dimension of a magnetic circuit small.

The step of inserting at least one nonmagnetic member between two of the magnets circumferentially adjacent to each other may include inserting the nonmagnetic member on which a room-temperature curable resin has been applied, or inserting the nonmagnetic member between the magnets, where a room-temperature curable resin has been injected.

The step of inserting at least one nonmagnetic member may be performed at a stage where one or some of the magnets have been inserted or after all of the magnets have been inserted annularly.

Further, the step of inserting at least one nonmagnetic member may be performed by inserting the nonmagnetic member between two magnets which have been already inserted, or may be performed in such a manner that the nonmagnetic member is inserted next to a magnet which has been already inserted, and then another magnet is inserted next thereto. Each magnet is fixed to the yoke (in a case where magnets are inserted from the cylindrical end along an axial direction) or to the round or annular members (in a case where magnet are inserted from a side of the cylinder along a radial direction) every time the magnet is inserted, but it is preferable that the magnets be assembled in such a manner that right after one magnet is inserted and fixed, a nonmagnetic member is inserted between the one magnet and a magnet that has been already inserted, so that the nonmagnetic member receives an attractive force between the magnets.

EXAMPLES

The following examples and comparative examples describe the present invention more specifically, but the present invention is not limited to the following examples.

Example 1

A dipole-ring magnetic circuit as illustrated in FIG. 1 was produced. Twenty-four trapezoidal prism magnets, each having a trapezoidal section perpendicular to a lengthwise direction (Material: NdFeB rare-earth sintered magnet, made by Shin-Etsu Chemical Co., Ltd., N42SH, Dimension: 8.5 mm×24.3 mm×60 mm×200 mm), and a cylindrical yoke (Material: SUS316, Dimension: φ 220 mm×200 mm×thickness of 10 mm) were used. As a nonmagnetic member, three types of thin plates made from brass and respectively having a thickness of 0.1 mm, 0.5 mm, and 1 mm (Dimension: 50 mm×80 mm, Tensile strength: 309 MPa) were used.

As illustrated in FIG. 5, a magnet was inserted from the cylindrical end along an axial direction by use of a guide (aluminum alloy) to be incorporated inside the yoke. Right after the magnet was inserted and fixed to the yoke, a thin plate was inserted between the magnet and a magnet adjacent thereto previously incorporated, while an epoxy resin (an epoxy resin made by Three Bond, Viscosity: 13 Pa·s) and a curing agent (Viscosity: 27 Pa·s) were being applied to the thin plate. The aforementioned three types of thin plates were combined appropriately depending on a size of each space between magnets, and the thin plates were inserted into all spaces between respective magnets, thereby forming a magnetic circuit. An external diameter of the magnetic circuit was measured by calipers in two directions, i.e., a direction of a magnetic field generated inside the magnetic circuit and a direction vertical to this direction (corresponding to external diameters in a vertical direction and in a lateral direction in FIG. 1). And further, a Hall element was attached to a three-dimensional actuator and a uniformity coefficient of the magnetic field was measured by use of a tesla meter. A force between magnets works so that the magnetic circuit is pressed and deformed in the direction of the magnetic field generated inside the magnetic circuit. However, a difference in the values of the external diameter in the above two directions was not more than 1 mm, and a uniformity coefficient of the magnetic field was 1%.

Example 2

A dipole-ring magnetic circuit similar to that in Example 1 is produced by a different assembling procedure of a magnetic circuit. The same magnets, cylindrical yoke, thin plates, epoxy resin, and curing agent as those in Example 1 were used.

As illustrated in FIG. 6, by use of round or annular members (material: SUS316), an auxiliary member (material: aluminum alloy), and a guide (material: aluminum alloy), magnets were inserted in a radial direction of the cylindrical magnetic circuit to be incorporated annularly. Right after a magnet was inserted and fixed to the round or annular members, a thin plate was inserted between the magnet and a magnet adjacent thereto previously placed, while an epoxy resin and a curing agent were being applied to the thin plate. After that, a yoke was put over an outside of the magnets incorporated annularly, and fixed thereto.

Similarly to Example 1, external-diameter dimensions and a uniformity coefficient of the magnets were measured. A difference in the values of the external diameter in the above two directions was not more than 1 mm, and the uniformity coefficient of a magnetic field was 1.1%.

Comparative Example 1

A dipole-ring magnetic circuit similar to that in Example 1 was produced without any filling between magnets. Similarly to Example 1, an external diameter and a uniformity coefficient of the magnets were measured. A difference in the values of the external diameter in the above two directions was 4 mm, and a uniformity coefficient of a magnetic field was 11%. A reason why the uniformity of the magnetic field was worse than those in Examples 1 and 2 is that a positional relationship between the magnets is deviated from an ideal placement.

What is claimed is:

1. A cylindrical magnetic circuit for generating a magnetic field in a space inside plural annularly positioned magnets, the circuit comprising:
   a plurality of annularly positioned magnets;
   a cylindrical yoke which located radially outside the magnets and is fixed to the magnets;
   at least one nonmagnetic member between at least one pair of circumferentially adjacent magnets; and
   a space inside of the plurality of annularly positioned magnets in which a magnetic field is generated,
   wherein an axial dimension of the nonmagnetic member is 30% to 95% of an axial dimension of the magnets, and a radial dimension of the nonmagnetic member is 30% to 95% of a radial dimension of the magnets.

2. The cylindrical magnetic circuit according to claim 1, wherein said at least one nonmagnetic member comprises at least two nonmagnetic members.

3. The cylindrical magnetic circuit according to claim 2, wherein an adhesive is provided between the at least one pair of circumferentially adjacent magnets and the nonmagnetic members and between the at least two nonmagnetic members.

4. The cylindrical magnetic circuit according to claim 1, wherein only one nonmagnetic member exists between at least one pair of circumferentially adjacent magnets, and wherein an adhesive is provided between the nonmagnetic member and the at least one pair of circumferentially adjacent magnets.

5. The cylindrical magnetic circuit according to claim 1, wherein the plurality of annularly positioned magnets have magnetization directions that generate a magnetic field of a dipole, a quadrupole, or a hexapol.

6. The cylindrical magnetic circuit according to claim 1, wherein the plurality of annularly positioned magnets are comprised of at least 8 magnets and at most 48 magnets having the same shape.

\* \* \* \* \*